(12) United States Patent
Seo et al.

(10) Patent No.: US 7,986,882 B2
(45) Date of Patent: Jul. 26, 2011

(54) OUTPUT CURRENT PUMPING CIRCUIT AND REMOTE CONTROLLER USING THE SAME

(75) Inventors: Jun-Ho Seo, Cheongju (KR); Jeong-Woo Lee, Osan (KR)

(73) Assignees: LG Electronics Inc., Seoul (KR); Eta Chips Co., Ltd, Cheongju (KR)

( * ) Notice: Subject to any disclaimer, the term of this patent is extended or adjusted under 35 U.S.C. 154(b) by 756 days.

(21) Appl. No.: 12/014,225

(22) Filed: Jan. 15, 2008

(65) Prior Publication Data

US 2008/0260387 A1    Oct. 23, 2008

(30) Foreign Application Priority Data

Apr. 19, 2007  (KR) .................. 10-2007-0038273
Jul. 5, 2007   (KR) .................. 10-2007-0067608

(51) Int. Cl.
H04B 10/04    (2006.01)
H04B 1/04     (2006.01)

(52) U.S. Cl. ................................. 398/106; 455/127.2

(58) Field of Classification Search .................. 398/106; 455/127.2

See application file for complete search history.

(56) References Cited

U.S. PATENT DOCUMENTS

| 4,089,062 | A | * | 5/1978 | McElroy et al. | ............... | 708/100 |
| 5,093,744 | A | * | 3/1992 | Sato et al. | ...................... | 398/106 |
| 2004/0124716 | A1 | * | 7/2004 | Shirato | ........................ | 307/130 |
| 2004/0136212 | A1 | * | 7/2004 | Abe et al. | ........................ | 363/59 |

FOREIGN PATENT DOCUMENTS

| KR | 20-1990-0013886 | 7/1990 |
| KR | 20-1992-0008643 | 5/1992 |
| KR | 10-1996-0028658 | 7/1996 |

* cited by examiner

Primary Examiner — Nathan M Curs
(74) Attorney, Agent, or Firm — KED & Associates, LLP

(57) ABSTRACT

A current pumping circuit includes a voltage detector, a boost circuit, and an output circuit. The voltage detector detects a level of a power voltage and outputs a corresponding control signal. The boost circuit controls the power voltage to be maintained at a predetermined level based on the control signal. The output circuit provides an output signal regardless of the level of the detected voltage. The output circuit may include or be coupled to a data converter, which generates the output signal based on a transmission signal and the boosted power voltage. The transmission signal may be one output from a predetermined control circuit.

11 Claims, 9 Drawing Sheets

OUTPUT CURRENT PUMPING CIRCUIT AND REMOTE CONTROLLER USING THE SAME

BACKGROUND OF THE INVENTION

1. Field of the Invention

The present invention relates to a circuit for pumping up current of an output port and a remote controller having the same, and particularly, to an output current pumping circuit, in which the output port of the present invention detects a level of power voltage with respect to drop of the power voltage and boosts and supplies the voltage to obtain output current of high voltage.

2. Description of the Related Art

Generally, if one or more keys are input through a keypad of a matrix structure in a remote controller, output ports of the key matrix are sequentially turned into a low state one by one by a port control unit, and each of the key inputs is read through a key input port having a structure having a pull-up resistor embedded therein. If a low input is read, a transmission signal of a predetermined format is generated at relevant output and input ports, and an output n-channel MOSFET (NMOS) transistor 100 embedded in an integrated circuit (IC) as shown in FIG. 1 or an output bipolar transistor 290 installed outside of the IC as shown in FIG. 2 is driven to turn on and off an infrared light emitting diode (LED) 110 and 210, whereby the generated signal can be transmitted to a device to be controlled that is apart at a certain distance. At this time, the maximum distance to which the signal can be transferred is referred to as a transmission distance, and the transmission distance is proportional to power voltage, and to current driven at the output NMOS transistor or the output bipolar transistor.

Accordingly, there will not be a problem when the power voltage VDD is high (in a high voltage state). However, if the power voltage is low (in a low voltage state), there is a problem in that capability of a current driver of the output NMOS transistor 100 or the output bipolar transistor 290 is distinguishably dropped, and thus, it is difficult to obtain high current of high voltage, whereby the transmission distance is also decreased.

In addition, a conventional pull-up resistor embedded in the key input port unit for reading key inputs from the key matrix 170 and 270 generally uses a single p-channel MOSFET (PMOS) transistor having an extended length equivalent to resistance, such as a PMOS transistor ($14^{th}$ MOS transistor) 710 shown in FIG. 3, and the pull-up resistor is turned on and off by controlling the gate of the PMOS transistor 710 in response to a control signal pull-up_enb. The resistance of the pull-up resistor has a characteristic of being inverse proportional to the power voltage. Particularly, since the resistance is adjusted to the operation performed under a condition of a power voltage of about 3V, the resistance is abruptly increased at a low power voltage of about 1.5V or less. Therefore, there is a problem in that since the conventional pull-up resistor has a resistance close to that of an off resistor of a key in the key matrix, the input port An is read as a low state even when the key is off, and thus, the IC mistakenly recognizes the key as being turned on.

SUMMARY OF THE INVENTION

Accordingly, the present invention is conceived to solve the problem of the output port described above. An object of the present invention is to provide an output current pumping circuit and a remote controller using the same, in which a level of power voltage is detected according to the drop of power voltage, and if the power voltage is dropped below a specific level, the power voltage is boosted and then supplied to the gate of the NMOS transistor 300 embedded in the IC or to the gate of a 5th metal-oxide-semiconductor (MOS) transistor 400 providing base current of the output bipolar transistor 490 installed outside of the IC, thereby obtaining an effect corresponding to output current of further higher power voltage.

Another object of the present invention, which is proposed to solve the problem of the pull-up resistor of a prior art, is to provide a remote controller, in which a poly, active or N-well resistor 830 equivalent to pull-up resistance is serially connected to a 15th MOS transistor 810 that is in charge of turning on and off the pull-up resistor, as shown in FIG. 8, so that a resistance increase rate at a low voltage is decreased to thereby solve the problem of the prior art that the resistance is increased as much as key off resistance, and the remote controller operates with one battery of about 1.5V since the operation at a low voltage of 1.5V or less, as well as the operation performed under a condition of a power voltage of 3V, is satisfied.

According to an aspect of the present invention for achieving the objects, there is provided a remote controller, comprising a key matrix 370 having a plurality of output ports and input ports of a remote control IC combined into keys of a matrix structure; a port control unit 330 for sequentially controlling the output ports B1 to Bm in order to find one or more pressed keys from the key matrix; a key input port unit 340 having a pull-up resistor embedded therein and reading input states A1 to An of the respective keys through a third buffer; a transmission signal generation unit 330 for generating a predetermined transmission signal for a combination of input and output ports corresponding to the pressed key; a control unit 320 for detecting a level of a first power voltage VDD and generating an output signal node-B in response to the transmission signal; a 4th MOS transistor 300 turned on and off depending on the output signal node-B of the control unit; an infrared LED 310 for emitting infrared rays as the 4th MOS transistor is driven; a battery 350 for supplying power to the IC and the infrared LED; and a third capacitor 360 for stabilizing the first power voltage VDD, wherein if the first power voltage VDD is below a specific level, output current is pumped up by driving the 4th MOS transistor with boosted voltage, whereby light emission of the infrared LED is intensified.

The remote controller may further comprise a bipolar transistor 490 connected to the infrared LED to allow the infrared LED to emit light; a 6th MOS transistor 480 turned off by boosted output voltage of the 4th MOS transistor; and a 5th MOS transistor 400 for receiving the voltage boosted higher than the power voltage VDD through a gate terminal and supplying boosted current to a base terminal of the bipolar transistor 490, wherein collector current of the bipolar transistor 490 is boosted as the boosted current is applied to the base terminal, and the boosted collector current is supplied to the infrared LED.

Further, the key input port may comprise the pull-up resistor formed of any one of a poly resistor, an active resistor and an N-well resistor having a low resistance increase rate at low voltage, the pull-up resistor having a first terminal connected to the first power voltage VDD and a second terminal connected to a first terminal of a 15th MOS transistor 810 for turning on and off the pull-up resistor; and the 15th MOS transistor having a gate terminal for receiving a control signal pull-up_enb, a second terminal connected to the key input port An, and the first terminal connected to the pull-up resistor; and the resistance increase rate at the low voltage may be decreased, whereby the remote controller operates at the low voltage.

In addition, the control unit may comprise a power voltage detection unit for detecting a level of the first power voltage VDD and generating a control signal EN, a boost circuit unit for generating boost voltage using the control signal EN and the transmission signal, and a data conversion unit for generating the output signal node-B in response to the boost voltage and the transmission signal; and the control signal EN may be disabled if the first power voltage VDD is higher than a specific voltage level and enabled if the first power voltage VDD is below the specific voltage level.

In the meantime, the boost circuit unit may comprise a logical operation unit for performing logical operation on the control signal and the transmission signal, and a boost unit for generating the boost voltage in response to an output signal of the logical operation unit. The logical operation unit may comprise a third inverter 511 for inverting the transmission signal, and an AND gate for performing a logical product operation on the control signal EN and the inverted transmission signal. The boost unit may comprise a 4th inverter 521 for inverting an output signal of the logical operation unit, a 7th MOS transistor having a gate terminal connected to an output terminal of the 4th inverter and a first terminal connected to a second power voltage GND, an 8th MOS transistor having a gate terminal connected to the output terminal of the 4th inverter and a first terminal connected to a node for generating the boost voltage, a 9th MOS transistor having a gate terminal connected to a second terminal of the 7th MOS transistor and a second terminal of the 8th MOS transistor, a first terminal connected to the node for generating the boost voltage and a second terminal connected to the first power voltage VDD, a first buffer 525 for buffering the output signal of the logical operation unit, and a 5th capacitor 526 having a first terminal connected to an output terminal of the first buffer and a second terminal connected to the node for generating the boost voltage. The 7th MOS transistor may be an NMOS transistor, the 8th and 9th MOS transistors may be PMOS transistors, and a bulk terminal of the 9th MOS transistor may be floated. Keeping the bulk terminal of the 9th MOS transistor to be floated, in stead of to apply the first power voltage VDD to the bulk terminal thereof, is to maintain the boost voltage higher than the first power voltage VDD.

Further, the data conversion unit may comprise a 5th inverter for inverting the transmission signal, a 10th MOS transistor having a gate terminal connected to an output terminal of the 5th inverter and a first terminal connected to a second power voltage GND, an 11th MOS transistor having a gate terminal to which the transmission signal is applied, a first terminal connected to the second power voltage GND and a second terminal connected to a node for generating the output signal node-B, a 12th MOS transistor having a first terminal connected to the boost voltage, a second terminal connected to a second terminal of the 10th MOS transistor and a gate terminal connected to the node for generating the output signal node-B, and a 13th MOS transistor having a first terminal connected to the boost voltage, a second terminal connected to the node for generating the output signal node-B and a gate terminal commonly connected to the second terminal of the 10th MOS transistor and the second terminal of the 12th MOS transistor. The 10th and 11th MOS transistors may be NMOS transistors, and the 12th and 13th MOS transistors may be PMOS transistors.

In addition, the 4th MOS transistor may be an NMOS transistor.

Further, the 5th MOS transistor may be an NMOS transistor, and the 6th MOS transistor may be a PMOS transistor.

In the meantime, according to another aspect of the present invention, there is provided an output current pumping circuit, comprising: a control unit for detecting a level of a first power voltage VDD and generating an output signal node-B in response to a transmission signal; and an output unit connected to the first power voltage VDD, for receiving the output signal node-B and generating output current, wherein the control unit detects the level of the first power voltage VDD, and the control unit boosts the first power voltage VDD and generates the output signal node-B if the first power voltage VDD is dropped below a specific level.

At this time, the control unit may comprise a power voltage detection unit for detecting a level of the first power voltage VDD and generating a control signal EN, a boost circuit unit for generating boost voltage using the control signal EN and the transmission signal, and a data conversion unit for generating the output signal node-B in response to the boost voltage and the transmission signal.

Here, the control signal EN may be disabled if the first power voltage VDD is higher than a specific voltage level and enabled if the first power voltage VDD is below the specific voltage level.

In addition, the boost circuit unit may comprise a logical operation unit for performing logical operation on the control signal and the transmission signal, and a boost unit for generating the boost voltage in response to an output signal of the logical operation unit.

Further, wherein the logical operation unit may comprise a third inverter 511 for inverting the transmission signal, and an AND gate for performing a logical product operation on the control signal EN and the inverted transmission signal.

Furthermore, the boost unit may comprise a 4th inverter 521 for inverting an output signal of the logical operation unit, a 7th MOS transistor having a gate terminal connected to an output terminal of the 4th inverter and a first terminal connected to a second power voltage GND, an 8th MOS transistor having a gate terminal connected to the output terminal of the 4th inverter and a first terminal connected to a node for generating the boost voltage, a 9th MOS transistor having a gate terminal connected to a second terminal of the 7th MOS transistor and a second terminal of the 8th MOS transistor, a first terminal connected to the node for generating the boost voltage and a second terminal connected to the first power voltage VDD, a first buffer 525 for buffering the output signal of the logical operation unit, and a 5th capacitor 526 having a first terminal connected to an output terminal of the first buffer and a second terminal connected to the node for generating the boost voltage.

Also, the 7th MOS transistor may be an NMOS transistor, the 8th and 9th MOS transistors may be PMOS transistors, and a bulk terminal of the 9th MOS transistor may be floated.

In addition, the data conversion unit may comprise a 5th inverter for inverting the transmission signal, a 10th MOS transistor having a gate terminal connected to an output terminal of the 5th inverter and a first terminal connected to a second power voltage GND, an 11th MOS transistor having a gate terminal to which the transmission signal is applied, a first terminal connected to the second power voltage GND and a second terminal connected to a node for generating the output signal node-B, a 12th MOS transistor having a first terminal connected to the boost voltage, a second terminal connected to a second terminal of the 10th MOS transistor and a gate terminal connected to the node for generating the output signal node-B, and a 13th MOS transistor having a first terminal connected to the boost voltage, a second terminal connected to the node for generating the output signal node-B and a gate terminal commonly connected to the second terminal of the 10th MOS transistor and the second terminal of the 12th MOS transistor.

At this time, the 10th and 11th MOS transistors may be NMOS transistors, and the 12th and 13th MOS transistors may be PMOS transistors.

Further, the output unit may comprise a current source having a first terminal connected to the first power voltage VDD and a second terminal connected to a node for generating output current, the current source adjusting the amount of current; and a 4th MOS transistor having a gate terminal to which the output signal node-B is applied, a first terminal connected to the node for generating output current and a second terminal connected to a second power voltage GND.

At this time, the 4th MOS transistor may an NMOS transistor.

As described above, the remote controller according to the present invention is effective in that a level of power voltage is detected according to the drop of the power voltage, and the power voltage is boosted and supplied when the power voltage is dropped below a specific level, and therefore, a superior output current characteristic is shown even at low power voltage.

Furthermore, in the present invention, a poly, active or N-well resistor is serially connected to the MOS transistor as a pull-up resistor at the key input port terminal, so that an increase rate of pull-up resistance is decreased even at low voltage compared with high voltage. Therefore, there is an advantageous effect in that errors generated by off resistance of a key are prevented, and the remote controller can sufficiently operate with a battery of about 1.5V.

Figure 1:
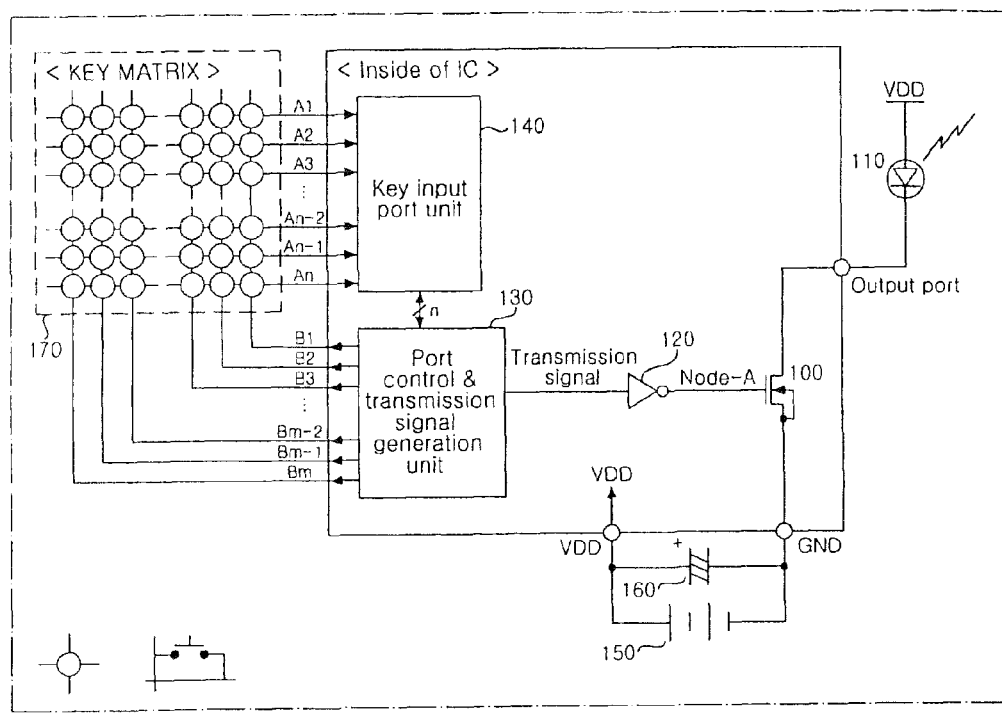
FIG. 1 is a block diagram of a general remote controller having an internal type infrared LED driven transistor of a prior art.
Figure 2:
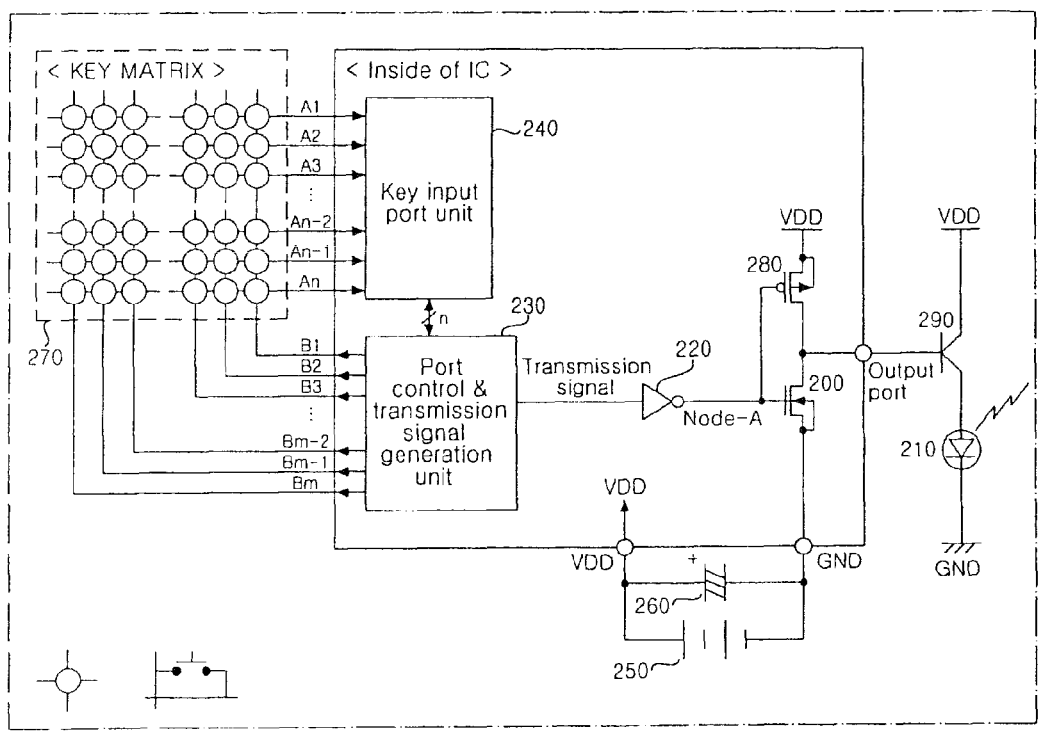
FIG. 2 is a block diagram of a general remote controller having an external type infrared LED driven transistor of a prior art.
Figure 3:
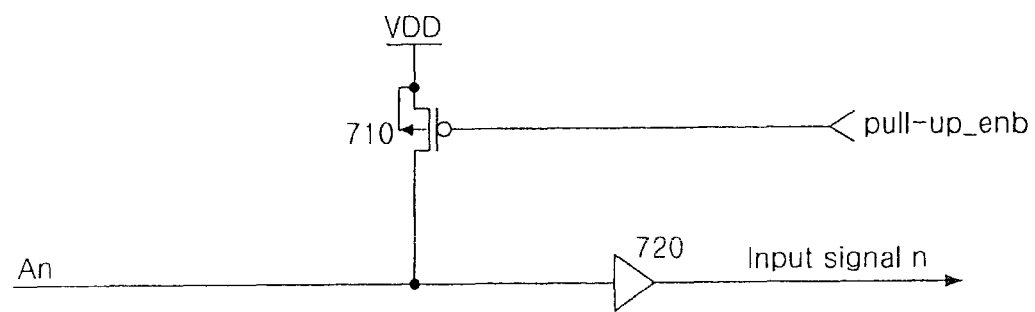
FIG. 3 is a circuit diagram of a general key input port of a prior art.

EXPLANATION OF REFERENCE NUMERALS FOR MAJOR PORTIONS SHOWN IN DRAWINGS 310, 410: Infrared LED
330, 430: Port control & transmission signal generation unit
340, 440: Key input port unit
350, 450: Battery
360, 460: Third capacitor, fourth capacitor
490: Bipolar transistor
370, 470: Key matrix (m outputs and n inputs)
320, 420: Control unit
321, 421: Boost circuit unit
322, 422: Power voltage detecting unit
323, 423: Data conversion unit
300: 4th MOS transistor
400: 5th MOS transistor
480: 6th MOS transistor
510: Logical operation unit
511: Third inverter
512: AND gate
520: Boost unit
521: 4th inverter
522: 7th MOS transistor
523: 8th MOS transistor
524: 9th MOS transistor
525: First buffer
526: Fifth capacitor
620: 10th MOS transistor
630: 11th MOS transistor
640: 12th MOS transistor
650: 13th MOS transistor
710, 810: 14th MOS transistor, 15th MOS transistor
720, 820: Second buffer, third buffer
830: Resistor

DESCRIPTION OF THE PREFERRED EMBODIMENT

Hereinafter, preferred embodiments of the present invention will be described in further detail with reference to the accompanying drawings.

Figure 4:
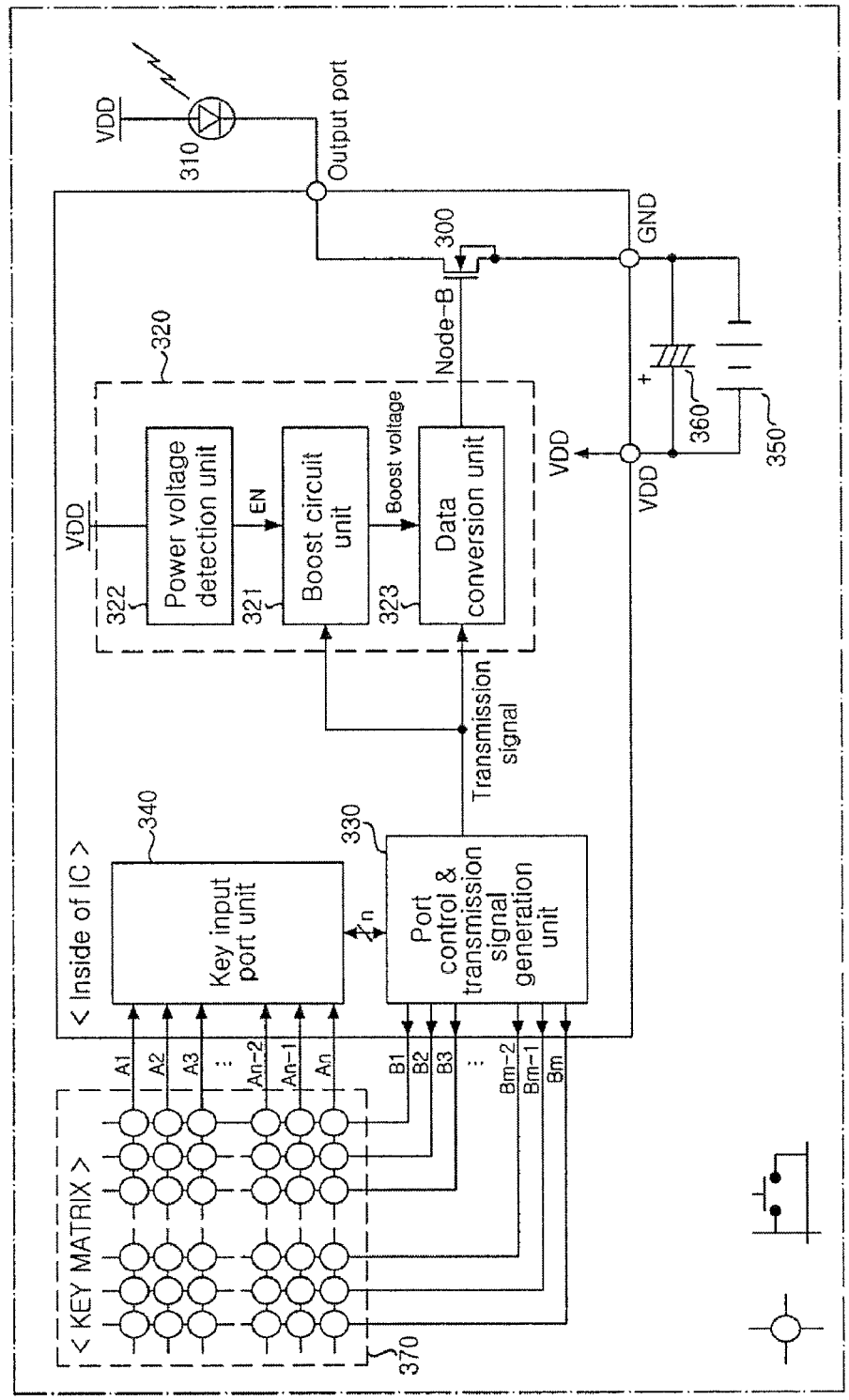
FIG. 4 is a block diagram of a remote controller having an internal type infrared LED driven transistor according to an embodiment of the present invention.

FIG. 4 is a view showing a remote controller according to an embodiment of the present invention.

As shown in the figure, the remote controller of the present invention comprises a key matrix 370 in which a plurality of output ports and input ports of a remote control IC are combined into keys of a matrix structure, a port control unit 330 for sequentially controlling the output ports B1 to Bm in order to find one or more pressed keys from the key matrix, a key input port unit 340 having a pull-up resistor embedded therein and reading input states A1 to An of the respective keys through a buffer, a transmission signal generation unit 330 for generating a predetermined transmission signal for a combination of input and output ports corresponding to the pressed key, a control unit 320 for detecting a level of a first power voltage VDD and generating an output signal node-B in response to the transmission signal, a 4th MOS transistor 300 turned on and off depending on the output signal node-B of the control unit, an infrared LED 310 for emitting infrared rays as the 4th MOS transistor is driven, a battery 350 for supplying power to the IC and the infrared LED, and a third capacitor 360 for stabilizing the first power voltage VDD.

In addition, the control unit detects a level of the first power voltage VDD, and boosts the first power voltage VDD and generates the output signal node-B if the first power voltage VDD is dropped below a specific level.

Figure 6:
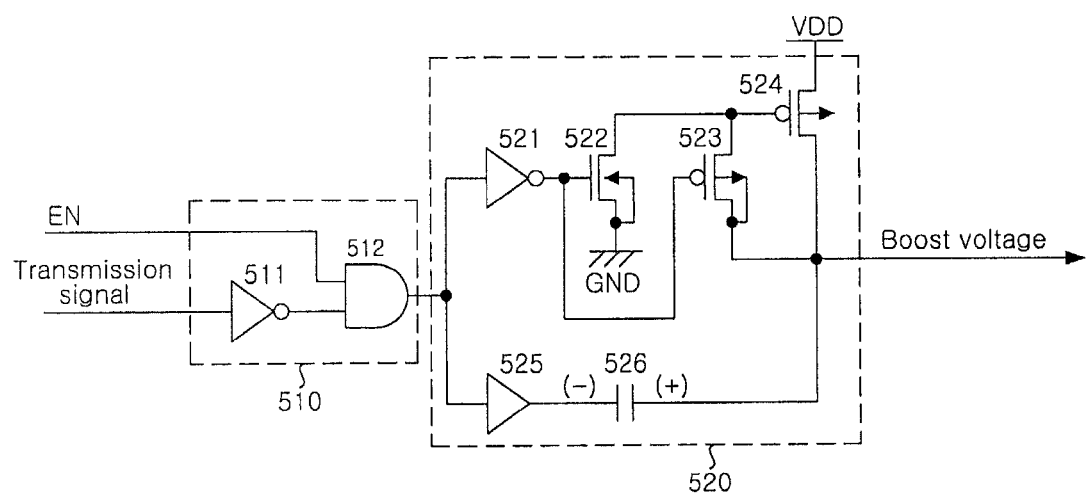
FIG. 6 is a circuit diagram of a boost circuit unit of an output current pumping circuit according to the present invention.

In addition, as shown in FIG. 6, the boost circuit unit of the remote controller according to the present invention comprises a logical operation unit 510 for performing logical operations on the control signal EN and the transmission signal, and a boost unit 520 for generating boost voltage in response to an output signal of the logical operation unit.

Figure 7:
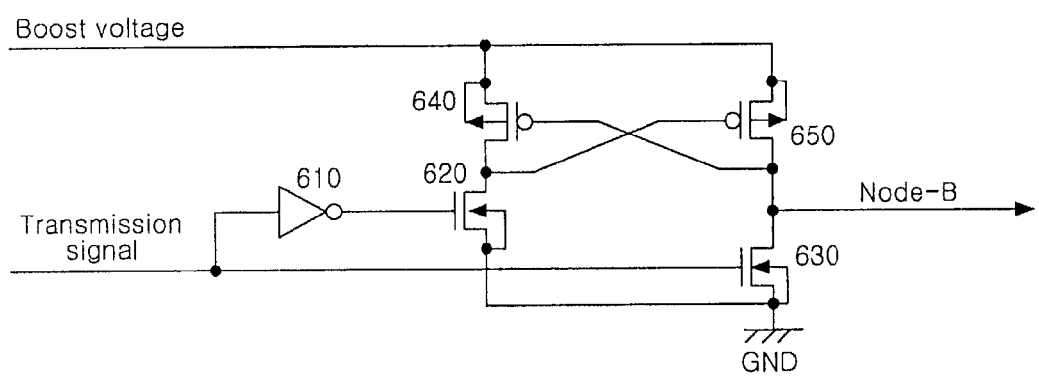
FIG. 7 is a circuit diagram of a data conversion unit of the output current pumping circuit according to the present invention.

In addition, as shown in FIGS. 6 and 7, the data conversion unit of the remote controller according to the present invention comprises a 5th inverter 610 for inverting the transmission signal; a 10th MOS transistor 620 having a gate terminal connected to an output terminal of the 5th inverter and a first terminal connected to a second power voltage GND; an 11th MOS transistor 630 having a gate terminal to which the transmission signal is applied, a first terminal connected to a second power voltage GND, and a second terminal connected to a node for generating the output signal node-B; a 12th MOS transistor 640 having a first terminal connected to the boost voltage, a second terminal connected to a second terminal of the 10th MOS transistor 620, and a gate terminal connected to the node for generating the output signal node-B; and a 13th MOS transistor 650 having a first terminal connected to the boost voltage, a second terminal connected to the node for generating the output signal node-B, and a gate terminal commonly connected to the second terminal of the 10th MOS transistor 620 and the second terminal of the 12th MOS transistor 640.

The transmission signal is internal signal corresponding to the pressed key, generated by the key input port unit, and signal for transmission to destination through Infrared LED.

Figure 9:
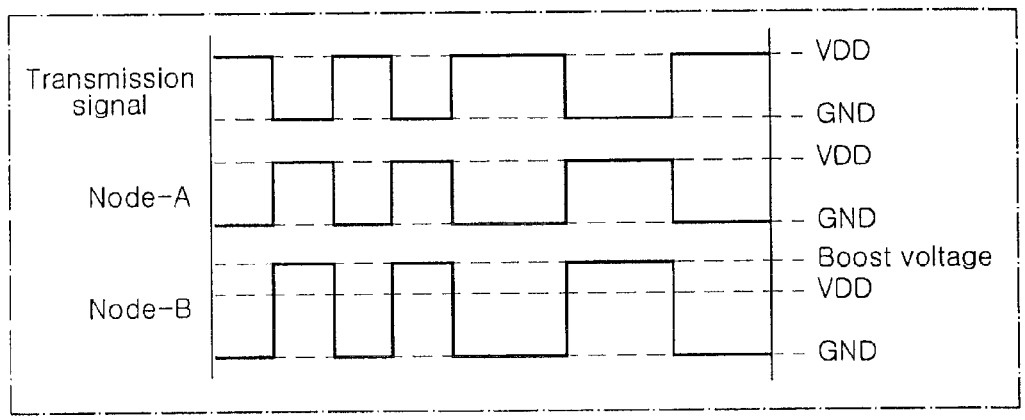
FIG. 9 is a view of comparison between operation waveform diagrams of the output current pumping circuits according to a prior art and the present invention.

Wherein, as shown in FIG. 9, the Infrared LED is on status if the transmission signal is GND level and off status if the transmission signal is VDD level. Of course, this is because a MOS transistor adapted to the data conversion unit is a NMOS transistor inducing an opposite phase of the transmission signal.

At this time, the 10th MOS transistor 620 and the lithe MOS transistor 630 are NMOS transistors, and the 12th MOS transistor 640 and the 13th MOS transistor 650 are PMOS transistors.

The operational principle of the embodiment of the present invention will be described below. If the first power voltage VDD is higher than a predetermined specific voltage level, the output signal EN of a power voltage detecting unit 322 is disabled, so that a boost circuit unit 321 does not boost the first power voltage VDD and outputs the first power voltage as it is as boost voltage. If the first power voltage VDD is dropped below the specific voltage level, the output signal EN is enabled from this point, and the boost circuit unit 321 can boost the first power voltage VDD. If the transmission signal to be output is high while the output signal EN is enabled, the output signal node-B is turned to low, and the 4th MOS transistor 300 is turned off, whereby the infrared LED 310 also stops emitting light.

At this time, the boost voltage, which is the output of the boost circuit unit 321, stays at the level of the first power voltage VDD, and contrarily, if the transmission signal is low, the boost voltage, which is the output of the boost circuit unit 321, becomes boost voltage. Then, the boost voltage is supplied to a data conversion unit 323, and thus, the output signal node-B arrives at the boosted voltage level as shown in FIG. 9. Therefore, the gate voltage of the 4th MOS transistor 300 is turned on to be higher than the first power voltage VDD, thereby showing an improved current characteristic as compared with a prior art in which a gate voltage is turned on to the level of the first power voltage VDD. Accordingly, the infrared LED 310 driven by the improved current emits light more intensively, and a further longer transmission distance is provided as compared with a prior art.

As a 9th MOS transistor 524 is turned off, the first power voltage VDD is applied to the minus (−) terminal of a fifth capacitor 526. Therefore, charge voltage of the capacitor 526, which is charged while the transmission signal is high, added to the first power voltage VDD, which is applied to the minus (−) terminal, makes the boost voltage, and then, it is output.

Figure 8:
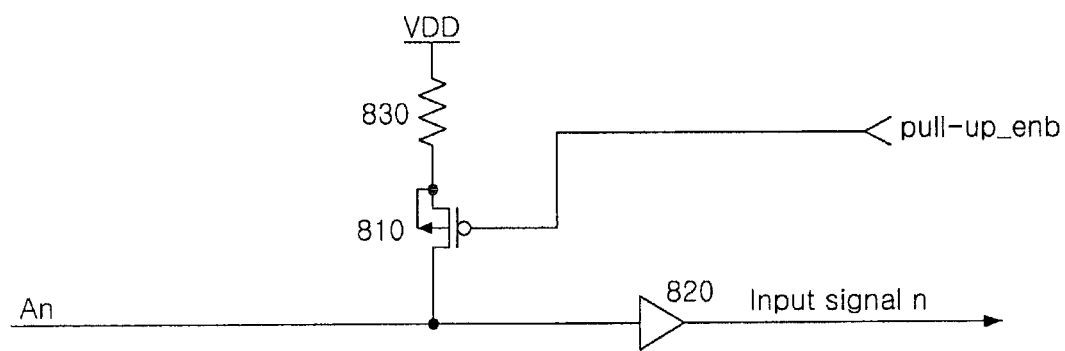
FIG. 8 is a circuit diagram of a key input port according to the present invention.

In addition, as a pull-up resistor according to the present invention embedded in the key input port unit that reads key input from the key matrix 370, a poly, active or N-well resistor 830 equivalent to pull-up resistance is serially connected to a 15th MOS transistor 810 that is in charge of turning on and off the pull-up resistor, as shown in FIG. 8. Therefore, a resistance increase rate at a low voltage is decreased, and thus, the problem of the prior art that the resistance is increased as much as key off resistance is solved. Accordingly, the operation at a low voltage of 1.5V or less, as well as the operation performed under the condition of a power voltage of 3V, is satisfied.

This is because the resistance applied to a field effect transistor (FET) is decreased when the voltage applied to the node-B is high, and thus, sufficient current can be obtained at the FET 300 only with voltage of 1.5V.

Figure 5:
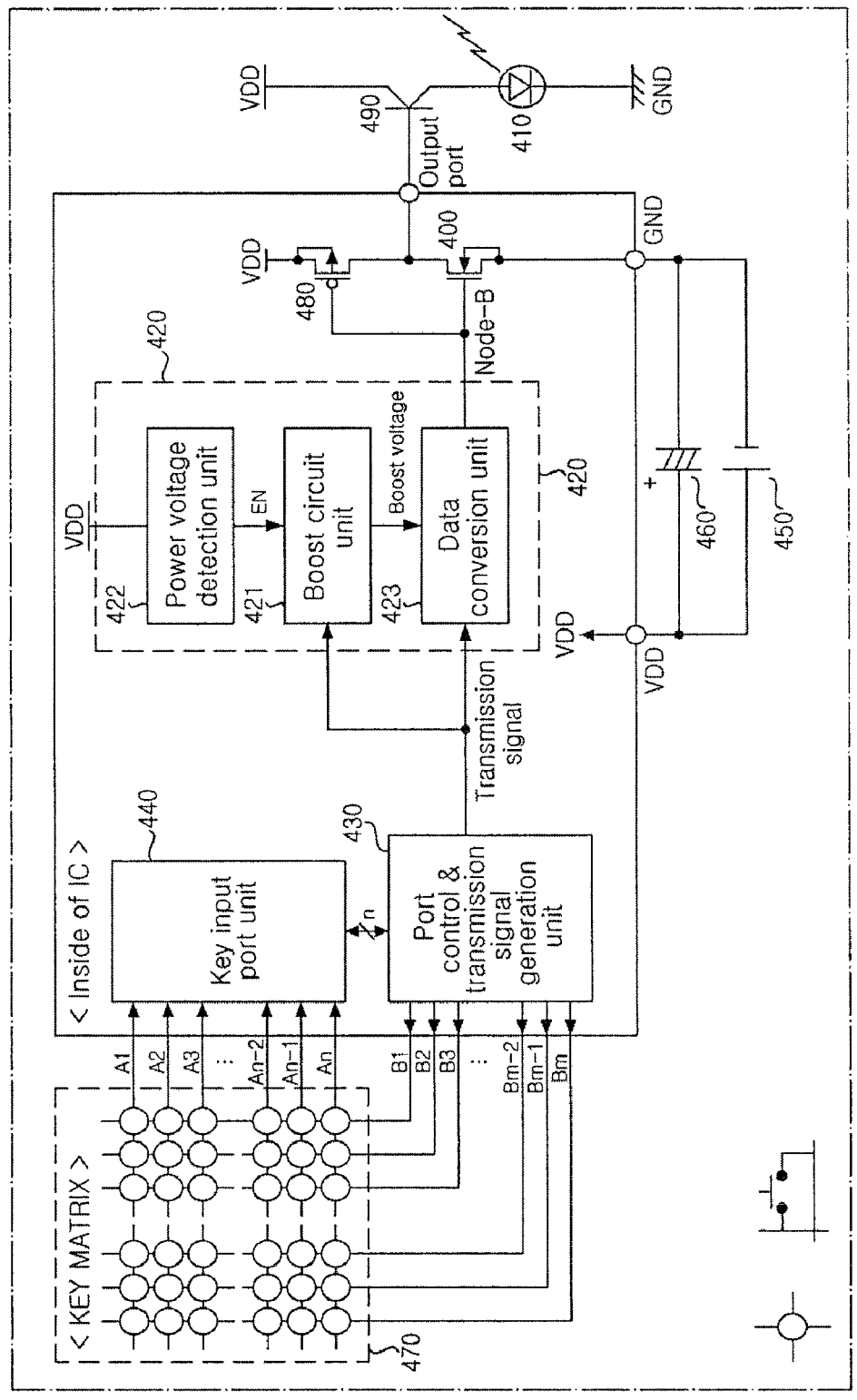
FIG. 5 is a block diagram of a remote controller having an external type infrared LED driven transistor according to an embodiment of the present invention.

In another embodiment of the present invention as shown in FIG. 5, the transistor that drives the infrared LED is a bipolar transistor 490 installed outside of a remote control IC. In this case, in the same manner as shown in FIG. 4, the remote controller comprises a key matrix 470 in which a plurality of output ports and input ports of a remote control IC are combined into keys of a matrix structure, a port control unit 430 for sequentially controlling the output ports B1 to Bm in order to find one or more pressed keys from the key matrix, a key input port unit 440 having a pull-up resistor embedded therein and reading input states A1 to An of the respective keys through a buffer, a transmission signal generation unit 430 for generating a predetermined transmission signal for a combination of input and output ports corresponding to the pressed key, a control unit 420 for detecting a level of a first power voltage VDD and generating an output signal node-B in response to the transmission signal, a 5th MOS transistor 400 turned on and off depending on the output signal node-B of the control unit, a 6th MOS transistor 480 turned on and off inversely to the 5th MOS transistor, a bipolar transistor 490 turned on and off by receiving an output of the 5th and 6th MOS transistors as an input of the base terminal, an infrared LED 410 for emitting infrared rays as the bipolar transistor is driven, a battery 450 for supplying power to the IC and the infrared LED, and a 4th capacitor 460 for stabilizing the first power voltage VDD. In the same manner as shown in FIG. 4, if the first power voltage VDD is dropped below a specific level, it is detected by the power voltage detection unit 422, and an output signal EN is transferred to the boost circuit unit 421. If the transmission signal is high, the boost circuit unit outputs the first power voltage VDD as boost voltage, while if the transmission signal is low, the boost circuit unit outputs a voltage boosted higher than the first power voltage VDD as the boost voltage. Then, the data conversion unit 423 receives the boost voltage, and if the transmission signal is high, the data conversion unit outputs a low output as an output signal node-B to turn off the 5th MOS transistor 400 and turn on the 6th MOS transistor 480, whereby the bipolar transistor 490 is turned off, and the infrared LED stops emitting light. Contrarily, if the transmission signal is low, the data conversion unit outputs the boost voltage as an output signal node-B to turn on the 5th MOS transistor 400 and turn off the 6th MOS transistor 480, whereby the bipolar transistor 490 is turned on and the infrared LED starts emitting light. At this time, since the boost voltage is applied to the gate of the 5th MOS transistor 400, further higher base current is supplied to the bipolar transistor. Accordingly, since the infrared LED is driven by the further higher current of the bipolar transistor, it emits light further intensively and can secure a further long transmission distance.

Hereinafter, referring FIGS. 4 to 7, the principle and process of charging in the boost circuit unit and boosting and outputting in the data conversion unit, which are performed through the operation of the transistors contained in the boost circuit unit and the data conversion unit will be described in detail.

The boost circuit unit 321 or 421 generates boost voltage using the control signal EN and the transmission signal.

At this time, since the first power voltage VDD is higher than a predetermined specific voltage level, when the control signal EN is disabled, a signal passing through an AND gate 512 is fixed to low regardless of the state of the transmission signal. The output signal of the AND gate 512 is inverted to high at a 4th inverter 521. At this time, a 7th MOS transistor 522, which is an NMOS transistor, is turned on, and an 8th MOS transistor 523, which is a PMOS transistor, is turned off. In addition, since the 7th MOS transistor is turned on, the 9th MOS transistor 524, which is a PMOS transistor, is turned on as described above.

In addition, the output signal of the AND gate 512 is applied to the minus (−) terminal of the capacitor 526 as the second power voltage GND through a first buffer 525, and the first power voltage VDD passing through the turned-on 9th MOS transistor 524 is applied to the plus (+) terminal, whereby the capacitor is charged. The first power voltage VDD that is not boosted is output as it is as boost voltage, which is the output of the boost circuit unit 321 or 421.

If the first power voltage is dropped below a specific voltage level and thus the control signal EN is enabled, the boost circuit unit 321 or 421 starts to operate.

At this time, if the transmission signal is high, a signal passing through a third inverter 511 is inverted to low, and therefore, a signal passing through the AND gate is fixed to low. At this time, as described above, since the 9th MOS transistor 524 is turned on, the boost voltage, which is the output of the boost circuit unit 321 or 421, is the same as the first power voltage.

On the other hand, if the transmission signal is low, a signal passing through the third inverter 511 is inverted to high, and therefore, a signal passing through the AND gate becomes high.

At this time, contrarily to the above case, the 7th MOS transistor 522, which is an NMOS transistor, is turned off, and the 8th MOS transistor 523, which is a PMOS transistor, is turned on. In addition, since the 8th MOS transistor 523 is turned on, the 9th MOS transistor 524, which is a PMOS transistor, is turned off.

As the 9th MOS transistor 524 is turned off, the first power voltage VDD is applied to the minus (−) terminal of the capacitor 526. Therefore, charge voltage of the capacitor 526, which is charged while the transmission signal is high, added to the first power voltage VDD, which is applied to the minus (−) terminal, makes the boost voltage, and then, it is output.

FIG. 7 is a circuit diagram of a data conversion unit of an output current pumping circuit according to the present invention. Referring to FIGS. 4, 5 and 7, the data conversion unit 323 or 423 generates the first output signal node-B in response to the boost voltage and the transmission signal.

If the transmission signal is high, the 11th MOS transistor 630 and the 12th MOS transistor 640 are turned on, and the 10th MOS transistor 620 and the 13th MOS transistor 650 are turned off. Therefore, the first output signal node-B is output as low, and the 4th or 5th MOS transistor 300 or 400 is turned off. At this time, current corresponding to the first power voltage VDD is output as it is as output current.

On the other hand, if the transmission signal is low, the 10th MOS transistor 620 and the 13th MOS transistor 650 are turned on, and the 11th MOS transistor 630 and the 12th MOS transistor 640 are turned off. Therefore, the boost voltage is output as the first output signal node-B, and the 4th or 5th MOS transistor 300 or 400 is turned on. Accordingly, a current characteristic corresponding to output current of high voltage is shown even in the first power voltage VDD of a low voltage state.

Although it has been described that the 4th and 5th MOS transistors 300 and 400 are limited to an NMOS transistor, it is only for convenience of explanation and PMOS transistors may also be applied in the same manner.

FIG. 9 is a view of comparison between operation waveform diagrams of the remote controllers according to the prior art and the present invention when the first power voltage VDD is below a specific level.

Referring to FIG. 9, it is understood that when the transmission signal is inverted from high to low when the first power voltage VDD is below a specific level, the output signal node-A according to the prior art is changed from GND to VDD, whereas the output signal node-B of the present invention is changed from GND to boost voltage boosted higher than the first power voltage VDD. Contrarily, when the first power voltage VDD is higher than a specific level, the output signal node-B of the present invention is also changed from GND to VDD like the output signal node-A of the prior art.

Although the present invention has been described in connection with the preferred embodiments illustrated in the drawings, the embodiments are only for illustrative purposes. It will be understood by those skilled in the art that various changes and modifications can be made thereto without departing from the technical spirit and scope of the present invention. Accordingly, the technical scope of the present invention should be defined by the technical spirit of the appended claims.

For example, the MOS transistor adapted to the data conversion unit may be a PMOS transistor. In this case, there is no change of phase between the transmission signal and output voltage of the node-B, and the key input port unit generate a signal having different phase (that is, 180° opposite phase).

What is claimed is:
1. A remote controller, comprising:
a key matrix having a plurality of keys in a matrix structure;
a transmission signal generator to generate a transmission signal corresponding to a pressed key;
a power voltage detector to detect a level of a power voltage (VDD) and to output a control signal corresponding to the level of the power voltage; and
a boost circuit to control the power voltage to be maintained at a predetermined level, wherein an output signal is provided based on the transmission signal regardless of the level of power voltage, wherein:
the power voltage detector is to generate the control signal to enable a driving signal to drive the boost circuit, if the detected level of power voltage drops below a specific level,
the control signal is to control driving of the boost circuit, and
the boost circuit maintains the power level up to a dropped level of the power voltage by boosting the power voltage based on the control signal.

2. The remote controller as claimed in claim 1, wherein the boost circuit receives the transmission signal from the transmission signal generator and the control signal from the power voltage detector, the boost circuit driven by the control signal to generate the boosted power voltage based on the transmission signal.

3. The remote controller as claimed in claim 1, further comprising a data converter to generate the output signal based on the transmission signal and the boosted power voltage.

4. The remote controller as claimed in claim 1, further comprising:
   a transistor controlled to turn on or off by the output signal, the transistor coupled to control a circuit coupled to receive the output signal.

5. An output current pumping circuit, comprising:
   a power voltage detector to detect a level of a power voltage (VDD) and to output a control signal corresponding to the level of the power voltage;
   a boost circuit to control the power voltage to be maintained at a predetermined level based on the control signal; and
   an output circuit to provide an output signal regardless of the level of the detected power voltage, wherein the output circuit includes or is coupled to a data converter to generate the output signal based on a transmission signal and the boosted power voltage, and wherein the transmission signal is output from a predetermined control circuit.

6. The remote controller as claimed in claim 5, wherein the booster circuit maintains the power level up to a dropped level of the power voltage by boosting the power voltage.

7. The remote controller as claimed in claim 6, wherein the control signal is to control driving of the boost circuit, and
   wherein the power voltage detector generates the control signal as an enable to drive the boost circuit, if a detected level of power voltage drops below a specific level.

8. The circuit as claimed in claim 7, wherein the power voltage detector generates the control signal as a disable (stop) signal for the boost circuit, if a detected level of power voltage (VDD) is higher than a specific voltage level.

9. The remote controller as claimed in claim 8, wherein the boost circuit receives the transmission signal from a transmission signal generator and the control signal from the power voltage detector, the boost circuit driven by the control signal to generate the boosted power voltage corresponding the transmission signal.

10. The remote controller as claimed in claim 5, wherein the output circuit comprises or is coupled to a transistor which is controlled to turn on or turn off by the output signal.

11. The remote controller as claimed in claim 5, wherein the predetermined control circuit corresponds to an electronic device that includes or is coupled to one or more keys.

* * * * *